United States Patent
Borley et al.

(10) Patent No.: US 10,257,134 B2
(45) Date of Patent: *Apr. 9, 2019

(54) E-MAIL INBOX ASSISTANT TO REDUCE CONTEXT SWITCHING

(71) Applicant: International Business Machines Corporation, Armonk, NY (US)

(72) Inventors: Andrew J. Borley, Blanford Forum (GB); Callum P. Jackson, Romsey (GB); Kathryn M. McMullan, Chandlers Ford (GB); Philip L. Norton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/847,117

(22) Filed: Sep. 8, 2015

(65) Prior Publication Data

US 2016/0182428 A1 Jun. 23, 2016

Related U.S. Application Data

(63) Continuation of application No. 14/575,201, filed on Dec. 18, 2014.

(51) Int. Cl.
  *H04L 12/58* (2006.01)
  *H04L 29/08* (2006.01)
  (Continued)

(52) U.S. Cl.
  CPC .... *H04L 51/046* (2013.01); *G06Q 10/063118* (2013.01); *H04L 51/22* (2013.01);
  (Continued)

(58) Field of Classification Search
  USPC .......................................................... 709/206
  See application file for complete search history.

(56) References Cited

U.S. PATENT DOCUMENTS 8,255,468 B2 8/2012 Vitaldevara et al.
8,392,516 B2 3/2013 Deluca et al.
(Continued)

FOREIGN PATENT DOCUMENTS

EP           1852789 A1 * 11/2007    ....... G06F 17/30707
WO      2007005412 A2      1/2007
WO   WO 2007005412 A2 *   1/2007    ......... H04L 12/5855

OTHER PUBLICATIONS

Allen, D., "OmniFocus™, GTD®, and You—Implementing the Getting Things Done® Methodology with OmniFocus", 4th Edition, © 2009, 2011, 2014 The Omni Group, <http://www.omnigroup.com/ftp/pub/software/macosx/Extras/Omni/Focus/GTDandOmniFocus.pdf>.

(Continued)

*Primary Examiner* — Chris Parry
*Assistant Examiner* — Caroline H Jahnige
(74) *Attorney, Agent, or Firm* — Daniel R. Simek (57) ABSTRACT

A method for managing processing of electronic messages. The method includes a computer processor identifying one or more electronic messages. The method further includes a computer processor determining one or more e-mail characteristics respectively associated with the identified one or more electronic messages. The method further includes a computer processor determining an estimated electronic message processing duration for the identified one or more electronic messages based, at least in part, on weighting factors that are associated with the determined one or more e-mail characteristics. The method further includes a computer processor identifying a first unscheduled time slot within an electronic calendar of a user. The method further includes a computer processor scheduling the identified one or more electronic messages within the identified first unscheduled time slot of the electronic calendar of the user.

9 Claims, 5 Drawing Sheets

(51) Int. Cl.
  *G06Q 10/06* (2012.01)
  *H04L 29/06* (2006.01)
(52) U.S. Cl.
  CPC ............ *H04L 51/24* (2013.01); *H04L 67/125* (2013.01); *H04L 67/306* (2013.01); *H04L 67/32* (2013.01); *H04L 67/42* (2013.01); *H04L 51/043* (2013.01)

(56) References Cited

U.S. PATENT DOCUMENTS

| | | | |
|---|---|---|---|
| 2002/0087584 A1* | 7/2002 | Hung ................ | H04M 1/72547 |
| 2009/0089133 A1* | 4/2009 | Johnson ............ | G06Q 10/1097 |
| | | | 705/7.21 |
| 2010/0153325 A1 | 6/2010 | Amoroso et al. | |
| 2011/0289106 A1* | 11/2011 | Rankin, Jr. ............ | G06Q 10/10 |
| | | | 707/769 |
| 2012/0290662 A1 | 11/2012 | Weber et al. | |
| 2013/0100139 A1* | 4/2013 | Schliesser ............... | G06T 11/00 |
| | | | 345/467 |
| 2014/0082521 A1 | 3/2014 | Carolan et al. | |
| 2015/0039705 A1* | 2/2015 | Kursun ................... | H04L 51/26 |
| | | | 709/206 |
| 2015/0081816 A1 | 3/2015 | Trevelyan | |
| 2015/0106741 A1* | 4/2015 | Friend ..................... | H04L 51/16 |
| | | | 715/752 |
| 2015/0112749 A1* | 4/2015 | Erdal .................. | G06F 3/04842 |
| | | | 705/7.19 |
| 2015/0264004 A1 | 9/2015 | Khoo | |
| 2015/0339015 A1* | 11/2015 | Wu ........................ | G06F 3/0482 |
| | | | 715/776 |

OTHER PUBLICATIONS

Collins, N., "Email 'raises stress levels'", Jun. 4, 2013, © Copyright of Telegraph Media Group Limited 2014, <http://www.telegraph.co.uk/science/science-news/10096907/Email-raises-stress-levels.html>.

Dekker, A., "How I Took Control of My Email Inbox", posted Feb. 28, 2013, <http://andreadekker.com/how-i-took-control-of-my-email-inbox/>.

Deschene, L., "Mindful Technology: Simplify Email & Reduce Inbox Stress", Tiny Buddha®, © 2014 Tiny Buddha, LLC, <http://tinybuddha.com/blog/mindful-technology-simplify-email-reduce-inbox-stress/>.

Schlipf, C., "Context Switches are Expensive," Occasional Thoughts, Yeap, Oct. 30, 2007, <http://www.yeap.de/blog2.0/archives/94-Context-Switches-are-Expensive.html>.

List of IBM Patents or Patent Applications Treated as Related, Appendix P, Filed Herewith.

Andrew J. Borley, et al., "E-Mail Inbox Assistant to Reduce Context Switching", U.S. Appl. No. 14/575,201, filed Dec. 18, 2014, (a copy is not provided as this application is available to the Examiner).

* cited by examiner

E-MAIL INBOX ASSISTANT TO REDUCE CONTEXT SWITCHING

BACKGROUND OF THE INVENTION

The present invention relates generally to the field of electronic messaging, and more particularly to handling and scheduling the reading of e-mail messages.

Electronic mail, most commonly referred to as email or e-mail is a method of exchanging digital messages from an author to one or more recipients. Modern e-mail operates across the Internet or other computer networks. Today's e-mail systems are based on a store-and-forward model. E-mail servers accept, forward, deliver, and store messages. The sender of an e-mail and the recipient of the e-mail do not need to be online simultaneously. The sender and recipient need connect only briefly, typically to a mail server, for as long as it takes to send or receive messages. An e-mail message is comprised of at least three components, the message envelope, the message header, and the message body. The message header contains control information, including, minimally, an originator's (i.e., sender's) e-mail address and one or more recipient addresses. Usually descriptive information is also added, such as a subject header field and a message submission date/time stamp. In addition, an e-mail message may contain text in various character sets and multi-media content attachments.

E-mail systems allow a user to send and receive information to and from various sources and individuals. Sources of e-mail messages range from business contacts to personal contacts, and social networks to advertisements (which may or may not be solicited). Business related e-mails often require a user to be responsive to superiors, coworkers, and clients. Whereas, personal e-mails and SPAM (i.e., undesired electronic messages) can detract from the productivity of a user.

SUMMARY

According to an aspect of the present invention, there is a method, computer program product, and/or system for managing processing of electronic messages. The method includes a computer processor identifying one or more electronic messages. The method further includes a computer processor determining one or more e-mail characteristics respectively associated with the identified one or more electronic messages. The method further includes a computer processor determining an estimated electronic message processing duration for the identified one or more electronic messages based, at least in part, on weighting factors that are associated with the determined one or more e-mail characteristics. The method further includes a computer processor identifying a first unscheduled time slot within an electronic calendar of a user. The method further includes a computer processor scheduling the identified one or more electronic messages within the identified first unscheduled time slot of the electronic calendar of the user.

DETAILED DESCRIPTION

Embodiments of the current invention recognize that one aspect of successful e-mail management is reducing context switching. Context switching between tasks and reacting to e-mails reduces the productivity of the user for a period of time after the user returns to the original task and regains the previous level of concentration. Proactively scheduling and processing e-mail messages can be time consuming, but the alternative, multi-tasking and continually reacting to each e-mail as it arrives throughout a day, can be distracting and stressful. Successful e-mail management can reduce distractions and improve user focus and productivity. Embodiments of the current invention estimate the time a user may expend processing one or more e-mail messages and provides the user a method to control how and when (e.g., auto-scheduling) the user processes the e-mail messages; thereby reducing context switching.

Embodiments of the current invention herein described relate to a personal inbox assistant and associated support functions. A personal inbox assistant, in accordance with various embodiments of the current invention, can provide a user the ability to filter, categorize, prioritize, estimate the e-mail processing time, and auto-schedule some or all e-mail messages in a predictable manner. The personal inbox assistant may also manipulate the visibility of e-mail messages or e-mail folders, further reducing user distractions. Filtering permits e-mails containing predefined characteristics to be processed in one manner and other e-mail are processed in a different manner. Categorizing permits the user to define parameters that the personal inbox assistant employs to group e-mail messages. Prioritization may act as an override to various user preferences. In some embodiments, estimation (of e-mail processing time) is based on weighting factors derived from a historical database of e-mail processing information, interactions, user expended e-mail processing times, and characteristics respectively linked to the e-mails that the user processed. In other embodiments, the weighting factors (e.g., coefficients) used to calculate e-mail processing duration estimates are based on "crowd-sourced" e-mail processing information or a mix of "crowd-sourced" and user specific e-mail processing information.

Figure 1:
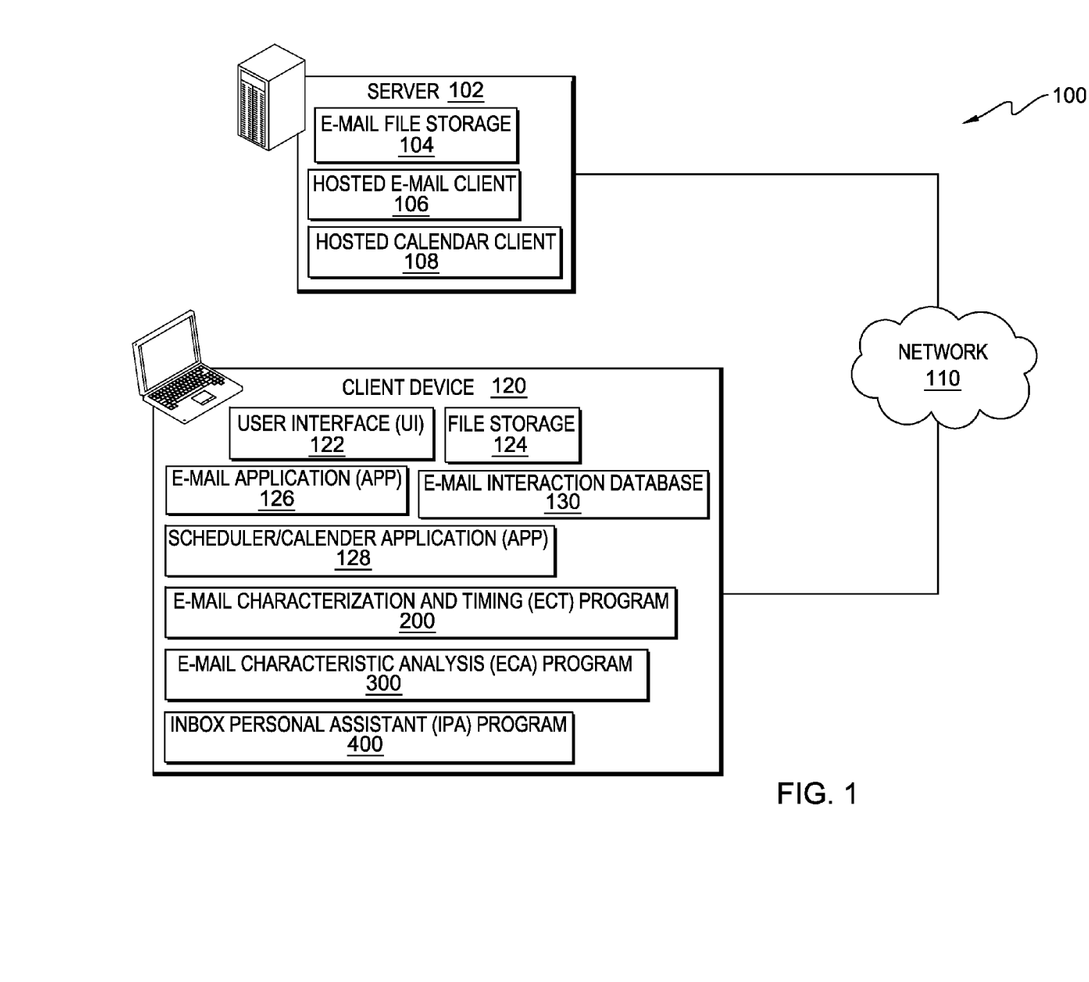
FIG. 1 illustrates a distributed data processing environment, in accordance with an embodiment of the present invention.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102 and client device 120 interconnected over network 110. Many modifications to the depicted environment may be made by those skilled in the art without departing from the scope of the invention as recited by the claims.

In one embodiment, client device 120 and server 102 communicate through network 110. Network 110 can be, for example, a local area network (LAN), a telecommunications network, a wide area network (WAN) such as the Internet, or any combination of the previous and can include wired, wireless, or fiber optic connections. In general, network 110 can be any combination of connections and protocols that will support communications between client device 120 and server 102, in accordance with embodiments of the present invention.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as client device 120 via network 110. Server 102 may include components, as depicted and described in further detail with respect to FIG. 5, in accordance with embodiments of the present invention.

Server 102 includes e-mail file storage 104, hosted e-mail client 106, and hosted calendar client 108. In an embodiment, e-mail files are stored in e-mail file storage 104 and are transmitted (e.g., downloaded, etc.) to client device 120, via network 110, in response to a request from e-mail application (app) 126. In another embodiment, e-mail files remain stored on server 102 to be accessed by hosted e-mail client 106. In one scenario, hosted e-mail client 106 is an enterprise software application and e-mail file storage 104 on server 102 and file storage 124 on client device 120 synchronize on a periodic basis. In another scenario, hosted e-mail client 106 is a web-based e-mail service accessible via user interface (UI) 122 on client device 120. In one instance, the web-based version of hosted e-mail client 106 stores e-mail files in e-mail file storage 104 on server 102. In another instance, the hosted e-mail client 106 stores e-mail files in a location (not shown) on the Internet accessible via network 110. In some embodiments, the web-based version of hosted e-mail client 106 may synchronize e-mail files with file storage 124 on client device 120.

In a different embodiment, hosted e-mail client 106 and hosted calendar client 108 are supplied to the client device, via virtualization technology, via network 110. In one scenario, hosted e-mail client 106 and hosted calendar client 108 may be separate software applications. In another scenario, hosted e-mail client 106 and hosted calendar client 108 are functions within an integrated "office" software application. Hosted e-mail client 106 and hosted calendar client 108 are provided by a virtual desktop infrastructure (VDI) or a desktop-as-a-service (DaaS), which may exist on server 102 or a cloud computing system (not shown) accessible via network 110. A user interfaces with hosted e-mail client 106 and hosted calendar client 108 accessible via user interface (UI) 122 on client device 120.

Client device 120 may be a personal computer (PC), a server, a laptop computer, a tablet computer, a netbook computer, a personal digital assistant (PDA), a smart phone, a wearable device (e.g., digital eyeglasses, smart glasses, smart watches), or any programmable computer system operating wired or wirelessly (e.g., WAN, laser, infra-red) known in the art. In general, client device 120 is representative of any programmable electronic device or combination of programmable electronic devices capable of executing machine readable program instructions and communicating with computers, such as server 102 via network 110. Client device 120 may include components, as depicted and described in further detail with respect to FIG. 5, in accordance with embodiments of the present invention.

Client device 120 includes user interface (UI) 122, file storage 124, e-mail application (app) 126, scheduler/calendar application (app) 128, e-mail interaction database 130, e-mail characterization and timing (ECT) program 200, e-mail characteristic analysis (ECA) program 300, inbox personal assistant (IPA) program 400, and various analytical programs (e.g., statistical, heuristic, etc.) (not shown). In some embodiments, ECT program 200, ECA program 300, and IPA program 400 execute concurrently. A user of client device 120 can interact with UI 122 via a singular device, such as touch screen (e.g., display) that performs both input to a graphical user interface (GUI) and as an output device (e.g., a display) presenting a plurality of icons associated with software applications or images depicting the executing software application. Optionally, a software application can generate UI 122 operating within the GUI of client device 120. UI 122 accepts input from a plurality of input/output (I/O) devices (not shown) including, but not limited to, a keyboard, a mouse, a trackball, a click wheel, a natural user interface (e.g., voice control unit, motion capture device, etc.), and a tactile sensor interface (e.g., a touch screen, a touchpad). The I/O device interfacing with UI 122 may be a component of client device 120 or may be connected to client device 120, which may operate wired (e.g., USB port) or wirelessly. The I/O devices provide input from the user in making selections in response to information presented to the user via UI 122.

In one embodiment, file storage 124 stores e-mail messages (e.g., files, associated content, etc.) on client device 120. In another embodiment, client device 120 periodically synchronizes e-mails stored in file storage 124 on server 102. Additionally, file storage 124 also includes one or more user profiles, one or more calendars, statistical and other data analysis programs (not shown), and folders/libraries for processed e-mail messages. User profiles are comprised of, but limited to, one or more e-mail IDs or e-mail accounts accessed, one or more filters, schedule definitions (e.g., working hours, project time slots), minimum e-mail time slot duration, e-mail flag designations, e-mail subfolders, e-mail/folder visibility, and e-mail processing preference rules (e.g., mix of flags, mix of originators, inbox prioritization, event triggers, etc.). In some embodiments, user profiles are customizable to permit a user to tailor the appearance, preferences, interactions, and behaviors of various user interfaces and program elements of the current invention.

In an embodiment, e-mail app 126 processes e-mail messages stored in file storage 124 on client device 120. In one scenario, e-mail app 126 downloads e-mails from server 102 when e-mail app 126 is activated. In another scenario, e-mail app 126 downloads the e-mails associated with a specific inbox or e-mail user ID when a user of client device 120 selects an inbox or user ID. In some embodiments, e-mail app 126 includes advanced e-mail functions. For example, e-mail app 126 may include setting priority flags, setting follow-up flags, adding an e-mail to a "to do" list, capabilities to access multiple e-mail ID and e-mail systems, and capabilities to automatically execute another program configured to handle a file type associated with an attachment linked to an e-mail.

In an embodiment, scheduler/calendar app 128 processes the schedules and calendars stored in file storage 124 on client device 120. In another embodiment, scheduler/calendar app 128 is associated with an enterprise application, such as an integrated office environment. Scheduler/calendar app 128 periodically synchronizes calendars with hosted calendar client 108 executing on server 102 via network 110.

E-mail interaction database 130 stores information related to the characteristics of processed e-mails, user interactions and associated timings, default behavior information, and individual and sets of weighting factors associated with various e-mail characteristics.

Figure 2:
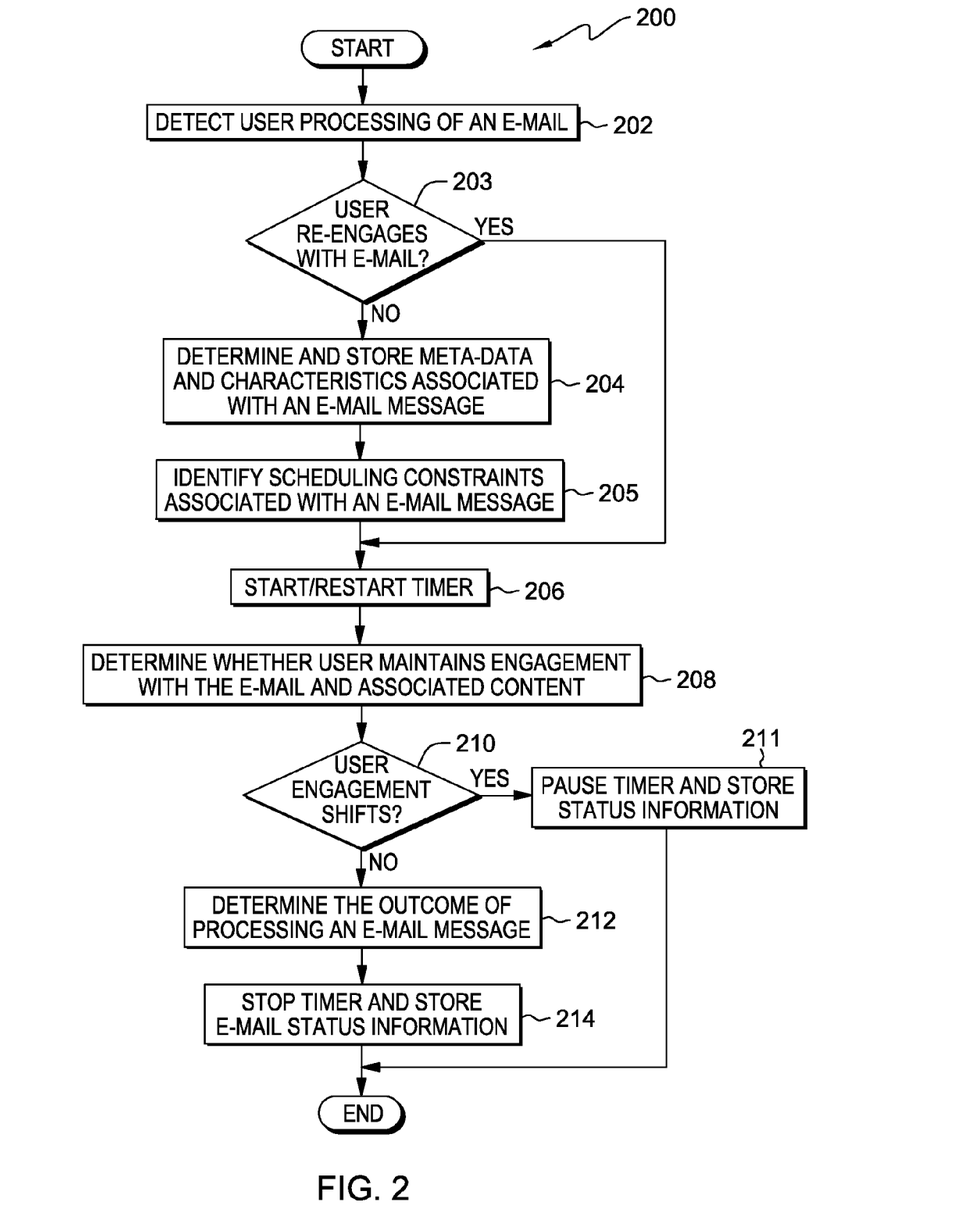
FIG. 2 depicts a flowchart of the steps of an e-mail characterization and timing program, in accordance with an embodiment of the present invention.

FIG. 2 is a flowchart depicting operational steps for e-mail characterization and timing (ECT) program 200, executing on client device 120 within distributed data processing environment 100 of FIG. 1. ECT program 200 may execute in the foreground, or ECT program 200 may execute in the background. Similarly, the behavior of ECT program 200 may vary based on the e-mail application invoked by a user. In one embodiment, ECT program 200 responds to e-mails processed on client device 120. In another embodiment, ECT program 200 responds to e-mails processed on server 102. ECT program 200 subsequently identifies the duration of the user interactions. In one embodiment, ECT program 200 monitors the interactions and timing associated with processing an e-mail message utilizing e-mail app 126. In another embodiment, ECT program 200 monitors the interactions and timing associated with processing an e-mail message utilizing hosted e-mail client 106. In a different embodiment, ECT program 200 and an e-mail client (not shown) executes within a virtualized environment, such as the Cloud via VDI or DaaS. ECT program 200 detects if the engagement of a user shifts and pauses one or more timers collecting duration data associated with processing an e-mail message. The shift in engagement may be associated with the execution of other software apps and the status of the e-mail application, or it may be related to client device 120 (e.g., sleep mode, desktop locking, etc.). ECT program 200 tracks both completed e-mail processing and partial e-mail processing and stores the information in e-mail interaction database 130.

In step 202, ECT program 200 detects a user processing an e-mail message via client device 120. In once scenario, ECT program 200 executes in the background on client device 120. In another scenario, ECT program 200 activates in response to a user activating an e-mail processing. In one embodiment, ECT program 200 detects the user interacting with e-mail app 126 executes to process the e-mail message. In another embodiment, ECT program 200 detects the user interacting with hosted e-mail client 106 and executes to process the e-mail message.

In decision step 203, ECT program 200 determines whether a user re-engages with a previously identified e-mail. If ECT program 200 determines that the e-mail is new or was not previously tracked, then re-engaging does occur (no branch, decision step 203). ECT program 200 subsequently determines various attributes associated with the e-mail message.

In step 204, ECT program 200 determines the meta-data and characteristics of an e-mail message. ECT program 200 stores the meta-data and e-mail message characteristics in e-mail interaction database 130 for subsequent sorting and analysis to determine the effect various e-mail message characteristics have on the duration of processing an e-mail message. In one embodiment, ECT program 200 identifies the characteristics associated with an e-mail message. For example, e-mail characteristics identified are an originator (e.g., e-mail ID and e-mail system), priority flag, meta-data (e.g., tags, labels, keywords, etc.), subject, Internet links, attachment type and size, and base e-mail message size. Additionally, ECT program 200 determines whether the subsequent scheduling of one or more e-mail messages are constrained by a "deadline" or "respond by date."

In step 205, ECT program 200 identifies scheduling constraints associated with an e-mail message. For example, an e-mail message can contain meta-data in the header information that identifies a deadline or a "respond by date." In one embodiment, ECT program 200 modifies the ordering or prioritization of an e-mail message containing a scheduling constraint. In another embodiment, ECT program 200 modifies the visibility of an e-mail message containing a scheduling constraint.

In step 206, ECT program 200 starts a timer for a new or previously untracked e-mail message. In one embodiment, ECT program 200 tracks the time duration to process an e-mail message via a single timer. In another embodiment, ECT program 200 associates a separate timer for each content item within the e-mail message. In some embodiments, the separate timers do not activate until the associated content item is processed. For example, the e-mail/text with the e-mail are assigned a first timer, a URL is assigned a second timer, and a word processing document is assigned a third timer. In a scenario, the first timer remains active while the user browses the URL associated with the e-mail message. The second timer notes the duration for the interaction with the URL by the user.

Referring back to decision step 203, if ECT program 200 determines that a user is re-engaging with a partially processed e-mail message (yes branch, decision step 203), then ECT program 200 restarts the corresponding one or more timers (in step 206). In one embodiment, the duration associated with the processing of an e-mail message is tracked via a single timer. In one scenario, the user returns to the original e-mail message or the user returns to a content item previously associated with the e-mail message, and ECT program 200 restarts the timer associated with the e-mail message (in step 206). In an instance, the user retrieves an e-mail message from the "trash" folder and re-engages with the e-mail message. ECT program 200 updates the information and status for the e-mail in e-mail interaction database 130. In another scenario, ECT program 200 determines that a shift in user engagement (e.g., focus) is attributed to the user locking the desktop of client device 120. If e-mail app 126 or hosted e-mail client 106 is not minimized or the program handling the content (e.g., attachment, URL, etc.) e-mail message is not minimized, is active, and is in view on the desktop, ECT program 200 restarts the timer when the user unlocks the desktop. In another embodiment, ECT program 200 activates more than one timer. In one scenario, the user of client device 120 opens a second e-mail message to obtain information needed to respond to a first e-mail. In another scenario, ECT program 200 starts a different timer for each content item associated with the e-mail message to which the user is responding. ECT program 200 maintains a log of the interactions and durations of fully processed e-mail messages and partially processed e-mail messages. For example, a user needs to look up information from various sources to respond to an e-mail message. Each instance of the user re-opening an e-mail message and adding content increases the total time that ECT program 200 associates with processing the e-mail message.

In step 208, ECT program 200 determines whether the user of client device 120 maintains engagement with the e-mail message or the associated content. Engagement refers to a relationship between a user and an object (e.g., visual representation) in the form of selective attention (i.e., focus)

and interactions. For example, ECT program 200 traces the activity of a user when the user activates a uniform resource locator (i.e., URL) link, which in turn responds by executing a web browser. However, if the user switches to a different webpage or URL, ECT program 200 may identify that the switch in focus corresponds to a shift in engagement. In one embodiment, ECT program 200 monitors the status of the window that displays when an e-mail message is opened. In one scenario, ECT program 200 determines that the e-mail window is minimized signaling user disengagement. In another scenario, the e-mail window remains open in one portion of the desktop; however, the user executes another program or opens another window signaling a change in focus, and ECT program 200 responds to the change in focus by initiating a second timer. In one instance, ECT program 200 determines that the user switched between the e-mail window and the other window within a duration identified within a user profile. ECT program 200 infers that the information within the other window is associated with responding to the e-mail message, and ECT program 200 determines that engagement is maintained. In another instance, ECT program 200 determines that the user shifted focus to the other window longer than the duration identified within a user profile. ECT program 200 determines that the user has disengaged from the e-mail message. ECT program 200 flags the start time of the second timer as the point in time that the user disengaged from the e-mail message.

In another embodiment, ECT program 200 tracks the interactions of the user with content (e.g., URL, attachments, embedded multi-media file, etc.) associated with the e-mail message, and ECT program 200 determines whether the user maintains engagement with the e-mail message. In one scenario, ECT program 200 tracks the interaction of a user with the embedded content (e.g., URLs) and attachments (e.g., word processing document). Content items are associated with different e-mail characteristics (e.g., file extension). For example, a spreadsheet file may take longer to process than a word processing document that is read. However, if the same word processing document is edited and re-attached to the e-mail message as part of a response, then editing a document can take longer than reviewing a spreadsheet. Therefore, ECT program 200 can identify secondary characteristics associated with content items of an e-mail message (e.g., spreadsheet-read, word processing document-read, word processing document-modified) and incorporate the secondary characterizes within e-mail interaction database 130. In another scenario, the e-mail has a word-processing file attached. ECT program 200 identifies minimizing the window of the word processor (not shown) and the e-mail application as a shift in engagement. In a different scenario, a user completes interacting with a content item associated with an e-mail message. The timer associated with the e-mail message containing the content remains unaffected; however, the content is treated as if the engagement of the user shifted.

In a different embodiment, ECT program 200 monitors system functions or system attributes of client device 120 to detect events that signify user disengagement from the e-mail message. For example, locking the desktop, initiating sleep mode on client device 120, lack of I/O activity for a predetermined time period signals ECT program 200 that the user disengaged from processing the e-mail message. In another example, if client device 120 was accessing hosted e-mail client 106 on server 102 and connectivity with network 110 was lost, then ECT program 200 may identify the loss of network connection a shift in engagement (no branch, decision step 210). If client device 120 can interact via UI 122 with the web-browser and process any e-mail messages downloaded to client device 120 in an "off-line," then mode ECT program 200 may determine that the user maintained engagement.

In decision step 210, in response to determining that the user engagement shifts from the e-mail message or content associated with the e-mail message (yes branch, decision step 210), ECT program 200 subsequently pauses the one or more timers associated with the e-mail message being processed or content associated with the e-mail message. Additionally, ECT program 200 stores the e-mail processing (i.e., status) information to date in e-mail interaction database 130 (in step 211).

In step 211, ECT program 200 pauses one or more timers and stores the information associated with the e-mail, including the current processing time(s) in e-mail interaction database 130. In one embodiment, ECT program 200 pauses one or more timers based on information and interactions from client device 120. For example, locking the desktop pauses the active timers. In another example, ECT program 200 polls client device 120 for a status of keyboard and mouse activities (i.e., I/O activity). If ECT program 200 determines that the lack of I/O activity surpasses a threshold, ECT program 200 pauses the active timers. In another embodiment, ECT program 200 responds to a shift in user engagement (e.g., focus). In one scenario, a user minimizes the e-mail processing program. In one instance, the e-mail processing program is e-mail app 126 executing on client device 120. In another instance, the e-mail processing program is hosted e-mail client 106 executing on server 102.

If ECT program 200 determines that a user did not shift focus (e.g., disengage) from the e-mail message and associated content (no branch, decision step 210), then ECT program 200 pauses to determine the outcome of the e-mail processing (in step 212).

In step 212, ECT program 200 determines the outcome of the processing of an e-mail message. Examples of outcomes include moving an e-mail message to a folder other than the inbox, saving an e-mail message as a draft, deleting the e-mail message, responding to the e-mail message, closing the e-mail message, tagging the e-mail message for follow-up, and forwarding the e-mail to another user. In one embodiment, a single timer is active tracking the interactions and outcome of the processing of an e-mail. In one scenario, the e-mail message is a new e-mail message and is tracked as one group of interactions. In another scenario, the user returns to complete the processing of an e-mail response that saved as a draft message. In another embodiment, ECT program 200 has multiple timers associated with the different content items within an e-mail message. As each content item is closed (e.g., indication of user engagement), ECT program 200 responds through the yes branch of decision step 210 and subsequently pauses the timer associated with the content item and stores the information in e-mail interaction database 130 (in step 211).

In step 214, ECT program 200 stops one or more timers associated with the outcome of the e-mail processing and saves the e-mail status (e.g., outcome) information in e-mail interaction database 130. In one embodiment, the time associated with the response to an e-mail message is a singular time based value associated with one or more characteristics. In another embodiment, ECT program 200 stores data from multiple timers, some respectively associated with content and characteristics associated with the e-mail message in e-mail interaction database 130.

Figure 3:
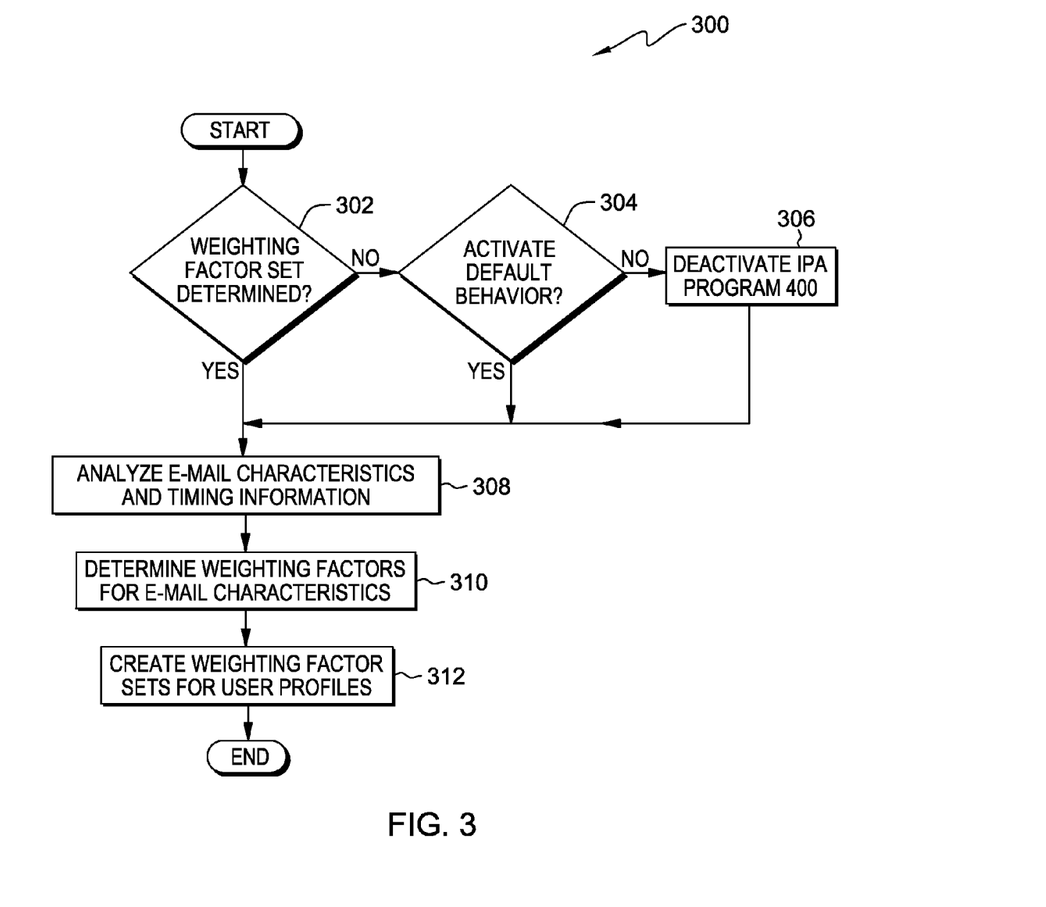
FIG. 3 depicts a flowchart of the steps of an e-mail characteristic analysis program, in accordance with an embodiment of the present invention.

FIG. 3 is a flowchart depicting operational steps for e-mail characteristic analysis (ECA) program 300, executing on client device 120 within distributed data processing environment 100 of FIG. 1. In one embodiment, ECA program 300 executes concurrently with ECT program 200 and IPA program 400. In another embodiment, ECA program 300 executes on a periodic basis. In one scenario, ECA program 300 creates additional weighting factor sets for a user. In another scenario, ECA program 300 adjusts the values of the weighting factors (e.g., coefficients) as the increased historical information, associated with e-mail processing, improves the accuracy of analytical methods employed to calculate the weighting factors. Weighting factor information is stored within e-mail interaction database 130. In a different embodiment, weighting factors may be based on e-mail processing time data gathered from a plurality of users. In one scenario, the weighting factors determined from a plurality of users is the basis for the default behavior. In another scenario, a user can transition (e.g., over time, once personal historical processing is available) from the weighting factors derived from a plurality of users to weighting factors derived from personal historical e-mail processing data, or a user may elect to use a mix of weighting factors from various sources.

In decision step 302, if ECA program 300 determines that a set of weighting factors are not calculated for a user profile (no branch, decision step 302), then ECA program 300 determines if a user profile identifies one or more rules or settings associated with a default behavior. In one embodiment, a default behavior is defined within a user profile. In another embodiment, a default behavior is stored on e-mail interaction database 130.

In decision step 304, if ECA program 300 determines that a user profile does not identify one or more rules or settings associated with a default behavior (no branch, decision step 304), then ECA program 300 subsequently deactivates IPA program 400 (in step 306).

In step 306, ECA program 300 deactivates IPA program 400 until the user modifies a user profile to set default values for e-mail processing times, accepts a default e-mail processing behavior, or copies one or more e-mail weighting factors from another source to the active user profile. Subsequently, ECA program 300 analyzes recently acquired e-mail message processing time information from ECT program 200 and e-mail interaction database 130 to determine whether sufficient data is available to determine one or more weighting factors (e.g., coefficients).

Referring to decision step 304, in an embodiment, if ECA program 300 determines that the user profile permits one or more default behaviors (e.g., algorithm, base-line weighting factors, etc.) (yes branch, decision step 304), then ECA program 300 loads the default information for subsequent use by IPA program 400. In one scenario, a default behavior is defined within a user profile. In another scenario, a default behavior is stored on e-mail interaction database 130.

In another embodiment, server 102 provides a hosted e-mail client 106, a hosted calendar client 108, and a hosted version of e-mail interaction database 130 (not shown), which also resides on server 102. ECT program 200, ECA program 300, and IPA program 400 are executed by a plurality of users employing a plurality of client devices communicating with server 102 via network 110. In this embodiment, information associated with e-mail message processing (e.g., characteristics, timings, weighting factors) is not shared. In a different embodiment, the hosting provisions for server 102 allow server 102 access to aggregate non-personal, e-mail characteristic information, and e-mail process timings from the hosted version of e-mail interaction database 130 (not shown). In one scenario, server 102 provides a hosted e-mail client 106 and a hosted calendar client 108 as an enterprise service. A hosted version of e-mail interaction database 130 allows server 102 to calculate a default behavior, a base-line set of weighting factors, or sets of weighting factors related to users with similar profiles. For example, a set of weighting factors may be shared among a business unit, a job description, or a department. In another scenario, server 102 provides a hosted e-mail client 106 and a hosted calendar client 108 as an Internet service. An Internet-based version of e-mail interaction database 130 (not shown) allows server 102 to calculate a default behavior, a base-line set of weighting factors, or sets of generalized (e.g., user community based) weighting factors for users of the hosted services. A user may set up a profile that instructs server 102 to provide a user specific set of weighting factors.

Referring to decision step 304, in an embodiment, if ECA program 300 determines that one or more sets of weighting factors exist for a user profile (yes branch, decision step 304), then ECA program 300 analyzes recent e-mail processing information obtained by ECT program 200 and historical data from e-mail interaction database 130 (in step 308).

In step 308, ECA program 300 analyzes one or more e-mail characteristics respectively associated with e-mail processing (e.g., timing) information obtained by ECT program 200. ECA program 300 stores the subsequent results of the analysis in e-mail interaction database 130. In addition, ECA program 300 determines which e-mails are associated with processing times that are not accurately estimated (e.g., outliers) and flags these e-mail entries in e-mail interaction database 130. For example, an outlier may be an e-mail that is associated with a processing time more than 2 standard deviations different that the average for the estimation. In one embodiment, ECA program 300 employs various analytical and mathematical methods (e.g., ANOVA, linear regressions, multivariate regression, etc.) to determine the relationships between e-mail characteristics and e-mail processing times. In one example, the processing time for e-mail messages from one group of originators is substantially affected by the size of an attachment. In another example, if the subject is "Human resource . . . ", then the e-mail processing time is strongly affected by the length of the e-mail text length.

In another embodiment, ECA program 300 utilizes heuristics and machine learning to identify the source for the outliers in the data. In a scenario, one group of outliers are attributed to a specific originator. ECA program 300 determines that there is a minimum 5 minute unanticipated additional e-mail processing time associated with handling an e-mail from this specific originator. For example, ECA program 300 cannot determine that the source of the extra time to process an e-mail from the specific originator is related to a phone call required by the originator of the e-mail. However, ECA program 300 may add a 5 minute bias to the e-mail message processing duration calculations for the specific originator (e.g., the ID of the e-mail originator is an important characteristic in this instance) in e-mail interaction database 130. In this example, ECA program 300 determines that a constant (i.e., a bias) is applied to e-mail estimation calculation as opposed to a weighting factor that determines a duration in which a characteristic is a variable.

In step 310, ECA program 300 determines the weighting factors for e-mail characteristics. In one embodiment, ECA program 300 further analyzes the e-mail characteristic and timing information from step 308. In one scenario, historical e-mail processing data for a user is the basis of the weighting factor calculations. This scenario produces results consistent to a user once sufficient historical e-mail processing data is collected, and the weighting factor calculations improve as additional e-mail processing data is incorporated. However, initial e-mail processing time estimates are delayed and may be inaccurate. For example, ECA program 300 may not assign a weighting factor to an e-mail characteristic that has a large standard deviation or a low confidence interval. However, once sufficient historical e-mail processing data is accumulated, ECA program 300 may determine that when paired with another e-mail characteristic, the characteristic without a weighting factor can be assigned a weighting factor when the two e-mail characteristics are related as a set. In another scenario, crowd-sourced (e.g., department based, enterprise based, Internet based) e-mail processing times may provide immediate weighting factors for ECA program 300 to utilize; however, e-mail processing time estimates may not be highly accurate. In a different scenario, a user may utilize a hybrid approach. For example, the user starts with crowd-sourced weighting factors (e.g., 100%) and no user based weighting factors (e.g., 0%). As the historical e-mail processing data accumulates, the percentage of crowd-source weighting factors diminish and user based weighting factors increase (e.g. 90/10, 70/30, 50/50, 25/75, 0/100). In one instance, ECA program 300 periodically adjusts the weighting factor percentages based on the statistical significance of the historical e-mail processing data. In another instance, the user manually adjusts the percentages. In another embodiment, ECA program 300 determines that one or more weighting factors are related. In one scenario, interacting weighting factors are handled utilizing logical operations that subsequently are utilized by ECA program 300 to create weighting factor sets (in step 312). In another scenario, ECA program 300 determines that interacting weighting factors either amplify or reduce the effect of one or more weighting factors. In one instance, ECA program 300 determines that there is a specific weighting factor applied to an e-mail containing a spreadsheet attachment or a word processing document. However, in another instance, if an e-mail contains both a spreadsheet and a word processing document, the results may be a non-linear function. In this instance for example, the weighting factor may be amplified by a power factor $$WFsh^{(1+(\frac{WPD}{100}))}$$

where WFsh=weighting factor for a spreadsheet and WPD=the size of the word processing document in kilobytes.

In step 312, ECA program 300 creates sets of weighting factors used for one or more user profiles. In one embodiment, the sets of weighting factors are based on the e-mail processing times associated with client device 120. In one scenario, the user creates a profile based on "normal" daily activities. In another scenario, the user creates an "end of quarter" profile with different requirements or rules. In a different scenario, ECA program 300 automatically creates one or more user profiles and associated weighting factor sets based on statistical models, mathematical models, heuristics, and machine learning. In another embodiment, a user is provided a list of default behaviors or weighting factors to use while the e-mail interaction database 130 acquires historical e-mail processing data. In one scenario, the default behaviors are associated with an installation package that installs e-mail interaction database 130, ECT program 200, ECA program 300, and IPA program 400 on client device 120. In another scenario, ECT program 200 determines default behaviors and sets of weighting factors by aggregating e-mail processing time for hosted e-mail client 106 on server 102.

Figure 4:
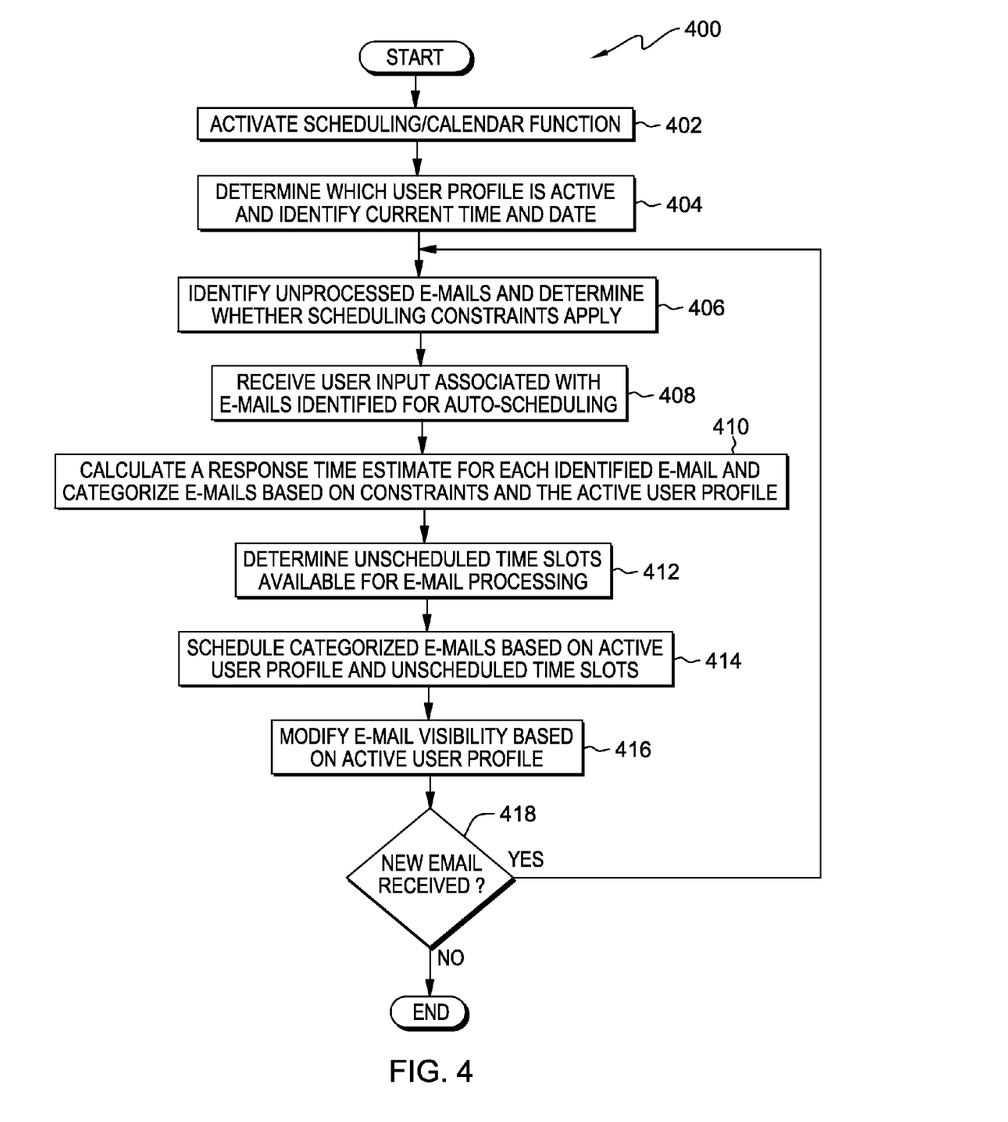
FIG. 4 depicts a flowchart of the steps of personal inbox assistant program, in accordance with an embodiment of the present invention.

FIG. 4 is a flowchart depicting operational steps for inbox personal assistant (IPA) program 400, executing on client device 120 within distributed data processing environment 100 of FIG. 1. IPA program 400 provides a user a method to control which e-mails to auto-schedule and the visibility of the auto-scheduled e-mail messages.

In step 402, IPA program 400 activates a scheduling/calendar function (e.g., software application). If the scheduling/calendar function is active, then IPA program 400 interfaces with scheduler/calendar app 128. In one embodiment, scheduler/calendar app 128 executes on client device 120. In another embodiment, the calendar function employed by a user executes on server 102 (e.g., hosted calendar client 108). Hosted calendar client 108 is accessed via network 110 through UI 122.

In step 404, in one embodiment, IPA program 400 determines which user profile is active for the current e-mail processing session and the value of current time and date. In one scenario, IPA program 400 is activated prior to any scheduled events (e.g., meetings, appointments, etc.). IPA program 400 has access to a full day schedule for a user. In another scenario, IPA program 400 is executed after the start of a workday. In an instance, IPA program 400 queries a user if the user wants to process e-mails past the end of the day and to define the period of time. In another embodiment, IPA program 400 determines which user profile to select by identifying the current time and date. In one scenario, a user executes IPA program 400 during a non-scheduled working time. For example, after normally scheduled hours or on a weekend. IPA program 400 determines that an indication was set identifying that priority or deadline identified e-mails are unprocessed. In another scenario, IPA program 400 provides the user a list of profiles from which to choose. In an instance, the user selects a profile; however, the user adjusts a constraint (e.g., how long to work) in the profile. IPA program 400 adjusts the behavior of the session based on the one or more constraints.

In step 406, in one embodiment, IPA program 400 identifies unprocessed e-mail messages and determines whether scheduling constraints (e.g., due date, respond by date, expiration date, etc.) apply to one or more of the identified unprocessed e-mail messages. In another embodiment, IPA program 400 determines that one or more new e-mails arrived and determines whether constraints are associated with any new e-mails. In one scenario, e-mail app 126 is part of an integrated office application that synchronizes with server 102 on a periodic basis. In another scenario, a user manually executes an update or refresh function to query server 102 for new e-mail messages.

In step 408, IPA program 400 receives user input associated with which e-mails are identified for auto-scheduling. Additionally, IPA program 400 determines the characteristics of each e-mail designated for auto-scheduling. IPA program 400 combines the characteristics with weighting factors to estimate a processing time for each auto-scheduled e-mail message. In one embodiment, IPA program 400 responds to user input to determine which unprocessed e-mails are designated for auto-scheduling. In one scenario, IPA program 400 auto-schedules all selected e-mails based on the active user profile and e-mails with associated constraints. In another scenario, IPA program 400 provides the user with one or more auto-scheduling options. In one instance, the user may apply various indications or flags to unprocessed emails, and IPA program 400 auto-schedules the flagged e-mail messages based on the definitions assigned to the indications or flags within the active user profile. In another instance, a user indicates that a primary sorting criteria is e-mail messages size. For example, organizing the auto-scheduled e-mails in order of increasing size. In another embodiment, IPA program 400 determines from the active user profile which e-mail messages, inboxes, or e-mail IDs are designated for auto-scheduling without user intervention.

In step 410, IPA program 400 calculates a response time for each e-mail message identified to be auto-scheduled. Additionally, IPA program 400 categorizes the e-mail messages to be auto-scheduled based on any scheduling constraints associated with an e-mail and the active user profile. In one embodiment, IPA program 400 employs weighting factors based on the analysis of historical e-mail processing times. In one scenario, IPA program 400 employs multiple sets of weighting factors to calculate the estimated processing time for each e-mail message. The set of weighting factors employed by IPA program 400 is dictated, at least in part, by the active user profile and the characteristics associated with an e-mail message. In another scenario, IPA program 400 employs default behaviors (e.g., weighting factors or algorithms associated with a user profile) set by ECA program 300 (in decision step 304). In another embodiment, IPA program 400 categorizes the e-mails selected for processing auto-scheduling. IPA program 400 categorizes the e-mails based on rules of filters identified within the active user profile. In one scenario, IPA program 400 categorizes the e-mails selected for processing auto-scheduling based on constraints and then originator. In another scenario, IPA program 400 categorizes the e-mails selected for processing auto-scheduling based on constraints and then on e-mail characteristics. In one instance, the active user profile identifies attachment and attachment size as the e-mail characteristic used by IPA program 400 to be a primary filter. In another instance, the active user profile categorizes the e-mail based on user set flags; however, IPA program 400 identifies a secondary filter that dictates how flagged e-mails are scheduled. For example, the secondary filter instructs IPA program 400 to schedule one e-mail message from each flagged category for each auto-scheduled e-mail processing time slot.

In step 412, IPA program 400 determines unscheduled time slots that are available within the calendar (e.g., scheduler/calendar app 128) of a user and how much time is available at each time slot of a user calendar. In one embodiment, IPA program 400 is able to auto-schedule e-mail processing to occur in any unscheduled time slot. In another embodiment, IPA program 400 is constrained by information within the active user profile. In one scenario, a user specifies that projects are worked during time slots of specific durations. For example, the user will work on projects for a period of between 2 and 3 hours. IPA program 400 can auto-schedule e-mail processing for unscheduled time slots of less than 2 hours or beginning after the third hour of project work. In another scenario, IPA program 400 identifies that the user begins processing auto-scheduled e-mails during a time slot that was previously identified as unavailable. IPA program 400 may signal the user for an indication of whether or not the user intends IPA program 400 to reschedule the remaining unprocessed e-mail messages (subsequently in step 414).

In step 414, IPA program 400 schedules (e.g., assigns) the categorized e-mails based on the active user profile and one or more unscheduled time slots. The estimated e-mail processing (e.g., response) time for individual e-mails is previously determined in step 410. Categorized e-mail messages may be stored in a plurality of folders and sub-folders. IPA program 400 calculates an aggregate e-mail processing time for each category, folder, and sub-folder. In one embodiment, IPA program 400 auto-schedules the e-mail messages identified for processing, based at least in part, on one or more e-mail constraints, e-mail categories, estimated e-mail processing duration, and the shortest available time slot (determined in step 412) in the schedule of a user. In another embodiment, IPA program 400 auto-schedules the e-mail messages identified for processing based on any e-mail constraints and the largest unscheduled time slot. In one scenario, IPA program 400 receives an indication that distractions are minimized. IPA program 400 selects constrained or high-priority e-mails for processing first, then the user indicates, via the UI 122, that the user will process the largest group of e-mails that can be scheduled for the next available time slot. In another scenario, a user indicates or selects a specific category of e-mails that have an aggregated processing time greater than an available time slot. IPA program 400 determines if the selected category of e-mails includes priorities or constraints and divides the e-mails of the selected category between two or more time slots. Alternatively, in another scenario, a user does not complete processing of the e-mails assigned to a time slot. In one instance, IPA program 400 may automatically reschedule the partially processed and unprocessed e-mails of the folder or category that the user was handling to another time slot. In another instance, IPA program 400 delays rescheduling unprocessed e-mails until one or more criteria are met. For example, IPA program 400 reschedules unprocessed e-mails during the processing of new e-mails. In another example, IPA program 400 may reschedule unprocessed e-mails during the time when a user is processing a group of e-mails that have an estimated processing time less than the time slot that the group of e-mails is auto-scheduled. In yet another embodiment, IPA program 400 auto-schedules e-mail processing independent of the length of the unscheduled time slots. In one scenario, e-mail processing scheduling is based on preferences indicated within the user profile. For example, time slots available after 12:00 PM. In another scenario, no preference is identified by IPA program 400. IPA program 400 subsequently auto-schedules e-mail processing beginning with the first unscheduled time slot. In an instance, IPA program 400 assigns a folder that has an aggregated estimated e-mail processing time equal to or less than the duration of the unscheduled time slot.

Referring to step 414, in a different embodiment, IPA program 400 may need to analyze multiple combinations of e-mails, folders, and unscheduled time slots to determine an auto-scheduling arrangement that meets the requirements of a user profile and auto-schedules the highest percentage of e-mail messages.

In another different embodiment, IPA program 400 may schedule multiple folders for the same time slot allowing a user to select a different group of e-mail messages to process without modifying the active user profile or preferences and triggering IPA program 400 to re-categorize and reschedule e-mail messages. IPA program 400 applies an indication to the folders as to the nature of the e-mail content (e.g., category, priority, estimated processing time, etc.) to provide the user information with which to base the e-mail processing folder selection.

In step 416, IPA program 400 modifies the visibility of auto-scheduled e-mail messages based on a preference within the active user profile. In one embodiment, auto-scheduled e-mail messages are listed as individual e-mails. In once scenario, auto-scheduled e-mails are hidden from view. In another scenario, the auto-scheduled e-mails remain in the inbox of the user and have an indication applied to identify that the e-mails are auto-scheduled. For example, the auto-scheduled e-mails may be signified by a flag or colored highlighting. In another embodiment, the auto-scheduled e-mail messages are transferred into folders. In one scenario, the e-mail messages are hidden within folders, but the folders are visible. In one instance, the folder names indicate the sorted categories that correspond to the e-mail messages. In another instance, the name of the folder indicates the calendar time slot the e-mails were auto-scheduled. In another scenario, one or more folders may be hidden based on criteria within a profile. In a different scenario, auto-scheduled e-mail messages may appear in multiple folders based on preferences (e.g., e-mail characteristic) within the active user profile to permit a user to change focus without IPA program 400 rescheduling e-mail messages based on the activation of a different user profile.

In one embodiment, at decision step 418, IPA program 400 executes in the background environment of client device 120 monitoring an e-mail application (e.g., e-mail app 126, hosted e-mail client 106) for receiving e-mail messages that are new. In one scenario, IPA program 400 loops back (yes branch, decision step 418) to process step 406. In one instance, IPA program 400 identifies one or more settings within a user profile dictating the manner in which the new e-mails are processed and auto-scheduled without further user intervention. In another instance, IPA program 400 identifies one or more settings within a user profile that dictate a response. For example, IPA program 400 may activate UI 122 for user input at process step 408 when the user begins an auto-scheduled e-mail processing time slot. In another example, IPA program 400 determines that a user profile setting dictates that an icon is displayed in the task bar. The icon indicates that an e-mail application (e.g., e-mail app 126, hosted e-mail client 106) received new e-mail messages. Selecting the icon permits the user to respond to IPA program 400. If IPA program 400 determines that one or more new received e-mail messages have a constraint or characteristic (e.g., high priority) defined in the user profile, then IPA program 400 displays a different icon in the task bar. In some embodiments, the e-mail application (e.g., e-mail app 126, hosted e-mail client 106) provides the icons related to receiving new e-mail messages. In another scenario, IPA program 400 pauses at decision step 418. In one instance, IPA program 400 periodically polls the e-mail application (e.g., e-mail app 126, hosted e-mail client 106) to determine whether new e-mail messages were received (yes branch, decision 418). In another instance, IPA program 400 pauses at decision step 418 until the user completes processing an auto-scheduled selection of e-mail messages. In yet another instance, IPA program 400 loops back to step 406 if a user does not process one or more e-mail messages scheduled for a time slot or processed one or more e-mails from a future time slot.

In another embodiment, if IPA program 400 determines that one or more new e-mail messages are received during the auto-scheduling operations (yes branch, decision step 418), then IPA program 400 incorporates the one or more e-mail messages that are new into the current auto-scheduling session. In one scenario, the one or more new e-mail messages are scheduled on a first-in first-out basis. E-mail messages with associated constraints are scheduled based on information within the active user profile. In another scenario, IPA program 400 combines the one or more new e-mail messages with the initial group of unprocessed e-mails and reschedules the e-mail processing time slots.

In decision step 418, IPA program determines if new e-mails are received. If IPA program 400 determines that no additional e-mails are received during the initial actions of IPA program 400 (no branch, decision step 418), then IPA program 400 terminates. In one scenario, IPA program 400 terminates unless a user activates a different e-mail application or logs into e-mail app 126 or hosted e-mail client 106 as a different user ID. In another scenario, IPA program 400 polls (e.g., refreshes) e-mail app 126 or hosted e-mail client 106 prior to terminating. In one instance, IPA program 400 immediately polls e-mail app 126 or hosted e-mail client 106. In another instance, IPA program 400 delays polling e-mail app 126 or hosted e-mail client 106. For example, the e-mail polling delay (e.g. refresh delay) may be set within a user profile, or the polling delay may be a function of the e-mail application or integrated office application.

Figure 5:
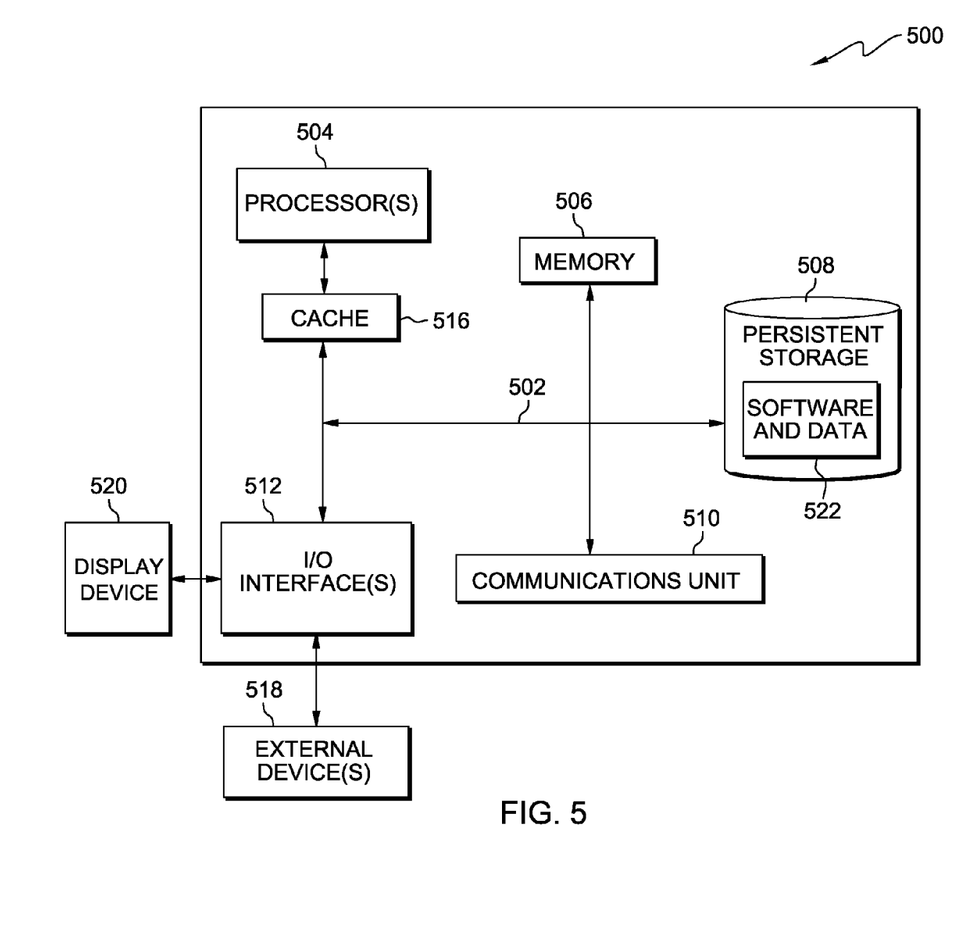
FIG. 5 is a block diagram of components of a computer, in accordance with an embodiment of the present invention.

FIG. 5 depicts computer system 500, which is representative of server 102 and client device 120, in accordance with an illustrative embodiment of the present invention. Computer system 500 is an example of a system that includes software and data 522. Processor(s) 504 and cache 516 are substantially equivalent to a multi-core processor. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data and data near accessed data from memory 506.

Program instructions and data used to practice embodiments of the present invention may be stored in persistent storage 508 for execution by one or more of the respective processors 504 via cache 516 and one or more memories of memory 506. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508. Software and data 522 are stored in persistent storage 508 for access and/or execution by one or more of the respective processors 504 via cache 516 and one or more memories of memory 506. With respect to server 102, software and data 522 includes, e-mail file storage 104, hosted e-mail client 106, and hosted calendar client 108. With respect to client device 120, software and data 522 includes user interface (UI) 122, graphical user interface (GUI) not shown, file storage 124, e-mail application (app) 126, scheduler/calendar application (app) 128, e-mail interaction database 130, e-mail characterization and timing program (ECT) program 200, e-mail characteristic analysis (ECA) program 300, inbox personal assistant (IPA) program 400, and various analytical programs (not shown).

Communications unit 510, in these examples, provides for communications with other data processing systems or devices, including resources of server 102 and client device 120. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data, and software and data 522 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor. Display 520 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing electronic messages, the method comprising:

identifying, by one or more computer processors, one or more electronic messages;

determining, by one or more computer processors, one or more e-mail characteristics respectively associated with the identified one or more electronic messages;

determining, by one or more computer processors, an estimated electronic message processing duration for the identified one or more electronic messages based, at least in part, on weighting factors that are associated with the determined one or more e-mail characteristics;

identifying, by one or more computer processors, a first unscheduled time slot within an electronic calendar of a user;

scheduling, by one or more computer processors, the identified one or more electronic messages within the identified first unscheduled time slot of the electronic calendar of the user;

creating, by one or more computer processors, an electronic message folder within an e-mail interface of the user, wherein the electronic message folder is associated with a time slot scheduled for processing one or more scheduled electronic messages;

identifying, by one or more computer processors, a first electronic message that includes a first category flag from among the one or more identified electronic messages;

adding, by one or more computer processors, the one or more scheduled electronic messages associated with the scheduled time slot to the electronic message folder, wherein adding the one or more scheduled electronic messages associated with the scheduled time slot to the electronic message folder further comprise:

determining, by one or more computer processors, whether the first electronic message that includes the first category flag is scheduled within the scheduled time slot; and in response to determining that the first electronic message that includes the first category flag is scheduled within the scheduled time slot, excluding, by one or more computer processors, other electronic messages that include the first category flag from the scheduled time slot;

assigning, by one or more computer processors, an indication to an electronic message folder that includes one or more scheduled electronic messages, wherein the indication assigned to the electronic message folder identifies the scheduled time slot of one or more electronic messages of the electronic message folder and is depicted in the e-mail interface of the user;

in response to determining that the user receives an additional electronic message prior to processing at least one of the one or more scheduled electronic messages associated with the scheduled time slot, identifying, by one or more computer processors, a first unprocessed electronic message of the one or more scheduled electronic messages associated with the scheduled time slot, wherein the identified first unprocessed electronic message includes a category flag that is different than a respective category flag of the additional electronic message; and rescheduling, by one or more computer processors, the received additional electronic message and the first unprocessed electronic message to a second unscheduled time slot based on determination that the second unscheduled time slot does not also include electronic messages with respective category flags that match the received additional electronic message and the first unprocessed electronic message.

2. The method of claim 1, wherein the weighting factors that are associated with the determined one or more e-mail characteristics associated with an identified electronic message are based on an analysis of historic electronic message processing time data that corresponds to the user and further comprising:

estimating, by one or more computer processors, a time duration for the user to read the identified electronic message; and determining, by one or more computer processors, an estimated time duration to perform one or more additional actions associated with creating a response to the identified electronic message.

3. The method of claim 1, wherein scheduling an electronic message is based, at least in part, on at least one of a constraint associated with the electronic message and an information within a user profile of the user, and wherein scheduling the identified one or more electronic messages within the identified first unscheduled time slot further comprises:
- determining, by one or more computer processors, that the determined estimated electronic message processing duration for the identified one or more electronic messages, respectively associated with different category flags, is longer than the identified first unscheduled time slot;
- in response to determining that the determined estimated electronic message processing duration for the identified one or more electronic messages, respectively associated with different category flags, is longer than the identified first unscheduled time slot, identifying, by one or more computer processors, a third unscheduled time slot within the electronic calendar of the user, wherein a time duration of the third unscheduled time slot is at least as long as the determined estimated electronic message processing duration for the identified one or more electronic messages; and
- program instructions to schedule the identified one or more electronic messages within the identified third unscheduled time slot of the electronic calendar of the user.

4. The method of claim 1, wherein scheduling the identified one or more electronic messages within the identified first unscheduled time slot further comprises:
- determining, by one or more computer processors, that the determined estimated electronic message processing duration for the identified one or more electronic messages is less than or equal to the identified first unscheduled time slot; and
- in response to determining that the determined estimated electronic message processing duration for the identified one or more electronic messages is less than or equal to the identified first unscheduled time slot, scheduling, by one or more computer processors, the identified one or more electronic messages within the identified first unscheduled time slot of the electronic calendar of the user.

5. The method of claim 1, wherein scheduling the identified one or more electronic messages within the identified first unscheduled time slot further comprises:
- determining, by one or more computer processors, that the determined estimated electronic message processing duration for the identified one or more electronic messages is longer than the identified first unscheduled time slot;
- in response to determining that the determined estimated electronic message processing duration for the identified one or more electronic messages is longer than the identified first unscheduled time slot, identifying, by one or more processors, a combination of two or more unscheduled time slots within the electronic calendar of the user, wherein a time duration of the combination of two or more unscheduled time slots are at least as long as the determined estimated electronic message processing duration for the identified one or more electronic messages; and
- scheduling, by one or more computer processors, the identified one or more electronic messages within the identified combination of two or more unscheduled time slots of the electronic calendar of the user.

6. The method of claim 1, further comprising:
- determining, by one or more computer processors, an aggregated estimated electronic message processing time duration for each of the one or more electronic message folders that contain at least one electronic message; and
- scheduling, by one or more computer processors, each of the one or more electronic message folders that contain at least one electronic message within one or more unscheduled time slots of the electronic calendar of the user, based at least in part, on the user profile of the user.

7. The method of claim 1, wherein the weighting factors that are associated with the one or more e-mail characteristics are based on an analysis of crowd-sourced electronic message processing time data associated with a plurality of other users and further comprising:
- estimating, by one or more computer processors, a time duration for the plurality of other users to read the identified electronic message; and
- determining, by one or more computer processors, an estimated time duration for the plurality of other users to perform one or more additional actions associated with creating a response to the identified electronic message.

8. The method of claim 1, wherein one or more e-mail characteristics respectively associated with the identified one or more electronic messages are selected from the group consisting of meta-data information associated with an electronic message, one or more keywords, one or more attachments, meta-data associated with an attachment, and one or more embedded Internet links.

9. The method of claim 2, wherein the one or more additional actions associated with creating a response to the identified message are selected from the group consisting of accessing one or more attachments, accessing an Internet link, downloading one or more items of content, review an item of content, modifying an item of content, and accessing one or more other electronic messages.

* * * * *